US009309984B2

(12) United States Patent
Cutler et al.

(10) Patent No.: US 9,309,984 B2
(45) Date of Patent: Apr. 12, 2016

(54) TEMPERATURE CONTROL OUTLET DEVICE

(71) Applicant: KYLIN Sanitary Technology (Xiamen) Co., Ltd., Fujian Province (CN)

(72) Inventors: Kyle William Cutler, Fujian Province (CN); Qingshuang Li, Fujian Province (CN); Mengshi Guo, Fujian Province (CN); Kaihuang Zhu, Fujian Province (CN)

( * ) Notice: Subject to any disclaimer, the term of this patent is extended or adjusted under 35 U.S.C. 154(b) by 302 days.

(21) Appl. No.: 14/032,215

(22) Filed: Sep. 20, 2013

(65) Prior Publication Data

US 2014/0311592 A1 Oct. 23, 2014

(30) Foreign Application Priority Data

Apr. 22, 2013 (CN) .......................... 2013 1 0139830

(51) Int. Cl.
| | |
|---|---|
| F16K 11/00 | (2006.01) |
| F16K 31/00 | (2006.01) |
| E03C 1/04 | (2006.01) |
| B05B 12/10 | (2006.01) |
| B05B 1/18 | (2006.01) |
| G05D 23/02 | (2006.01) |
| E03B 1/04 | (2006.01) |

(52) U.S. Cl.
CPC ................ *F16K 31/002* (2013.01); *B05B 1/18* (2013.01); *B05B 12/10* (2013.01); *E03C 1/041* (2013.01); *E03C 1/0408* (2013.01); *G05D 23/025* (2013.01); *E03B 1/048* (2013.01); *Y10T 137/7737* (2015.04)

(58) Field of Classification Search
CPC ..... F16K 31/002; E03C 1/0408; E03C 1/041; B05B 1/18; B05B 12/10; G05D 7/01; Y10T 137/7737; E03B 1/048
See application file for complete search history.

(56) References Cited

U.S. PATENT DOCUMENTS 1,814,512 A * 7/1931 Hetherington .......... B05B 12/10
137/877
1,877,510 A * 9/1932 Hughes ................... B05B 12/10
137/468

(Continued)

FOREIGN PATENT DOCUMENTS

CN 102425685 A * 4/2012
JP 2006283274 A * 10/2006

OTHER PUBLICATIONS

Machine Translation of JP2006283274A from EPO website; retrieved Sep. 9, 2015.*

(Continued)

*Primary Examiner* — Jessica Cahill
(74) *Attorney, Agent, or Firm* — Prakash Nama; Global IP Services, PLLC

(57) ABSTRACT

A temperature control outlet device including a body, a faceplate and an outlet assembly inside the body; the outlet assembly includes a valve connected to the body; the valve includes a mainstream and a diversion vent; a valve rod is provided inside the mainstream for blocking water flow in the mainstream via a bias spring on the bottom and a memory spring on the top. The diversion vent is connected to a diversion assembly. The diversion assembly includes a switching rod having one end connected to a reset spring and another end connected to a button. The temperature control outlet device automatically stops outflow of water when the water turns from cold to hot.

7 Claims, 9 Drawing Sheets

(56) References Cited

U.S. PATENT DOCUMENTS

| | | | | | |
|---|---|---|---|---|---|
| 4,210,284 | A | * | 7/1980 | Tarnay | B05B 12/10 137/468 |
| 4,778,104 | A | * | 10/1988 | Fisher | G05D 23/025 137/468 |
| 4,854,499 | A | * | 8/1989 | Neuman | E03C 1/04 137/624.2 |
| 2007/0194141 | A1 | * | 8/2007 | Brown | E03C 1/0408 236/93 A |
| 2008/0072971 | A1 | * | 3/2008 | Honeychurch | E03B 1/04 137/468 |
| 2011/0146812 | A1 | * | 6/2011 | Hong | F16K 11/044 137/468 |
| 2012/0012198 | A1 | * | 1/2012 | Schneider | E03B 1/048 137/468 |

OTHER PUBLICATIONS

Machine Translation of CN102425685A from EPO website; retrieved Sep. 9, 2015.*

* cited by examiner

B-B

TEMPERATURE CONTROL OUTLET DEVICE

BACKGROUND OF THE INVENTION

This invent is about one outflow device, especially for temperature control in household water supply.

In European and American regions, central-water-supplying is quite popular and normal in every household which will control each tap in the house, the same for the hot water. Europeans and Americans like to take a shower each morning, but before hot water is ready, should first run out all cold water reserved in the hose from the system to the tap. Since it is hurry in the morning if to wait beside the shower it will waste your time but if you don't wait then after running out all cold water hot water will automatically follow which will waster water. So how to multi-task (such as making breakfast but not wasting hot water) during water warming-up is a question well deserved to be discussed.

BRIEF SUMMARY OF THE INVENTION

The invent is to solve an existing problem that how to stop flowing after cold water is being run out and provide a system to control water by temperature.

To solve the above problem, this invent is going to take the following technology:

It is a temperature control outlet device, including parts as body, faceplate communicating with the outlet end of the body, and the outlet assembly inside the body. The said outlet assembly includes a valve connected to the said body. The said valve is divided into a mainstream and a diversion vent. There is a valve rod inside the channel of the said mainstream, which will open/close the said mainstream flow through a bias spring on the bottom and a memory spring on the top. The said diversion vent is connected to the diversion assembly and then makes a diversion channel. The said diversion assembly includes a switching rod with one end connected to a offsetting spring while the other connected to a button so as to open/close the said diversion channel.

To further, there is a one-way valve behind the claimed diversion channel.

To further, the claimed button is being connected to a switch inside the body which is at one side of the faceplate.

To further, there is a bore inside the valve rod whose top is connected to the trickling hole from mainstream.

To further, the switching rod is being connected to the trickling hole from diversion channel.

To further, valve bottom outlet is being connected to the valve itself as an acute angle.

To further, there is an outlet at the bottom of the mainstream.

To further, there are seals over on/off section on both of the valve rod and switching rod.

Comparing with the existing technology, this invent lies its strong points in the following:

Add a valve rod inside the mainstream which will open/close the mainstream flow through the bottom bias spring and the top memory spring. When cold water run out, hot water will go inside the mainstream channel then the memory spring will extend because of high temperature which will push downward the valve rod and close the mainstream flow; the hot water has to go into the diversion channel. If you need hot water, then just push the button which will move the switching rod and open the diversion channel then hot water will flow through this channel. The temperature control device of this invent will stop outflow when running out cold water so as to save hot water and time because people can go ahead with other tasks during this time which in a way make it pretty practical.

DETAILED DESCRIPTION OF THE INVENTION

Herein we will have a further explanation towards detail carrying out mode.

The first mode of carrying out the invention.

Figure 1:
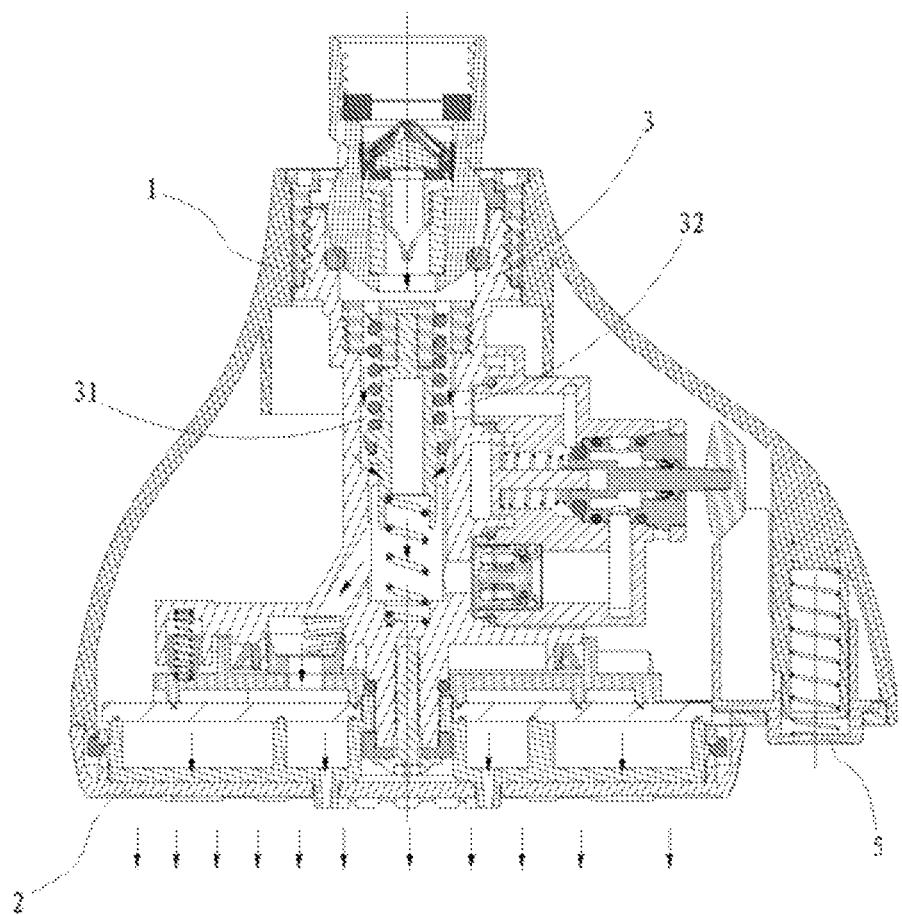
FIG. 1 is a schematic section for the first mode of carrying out the invention.
Figure 2:
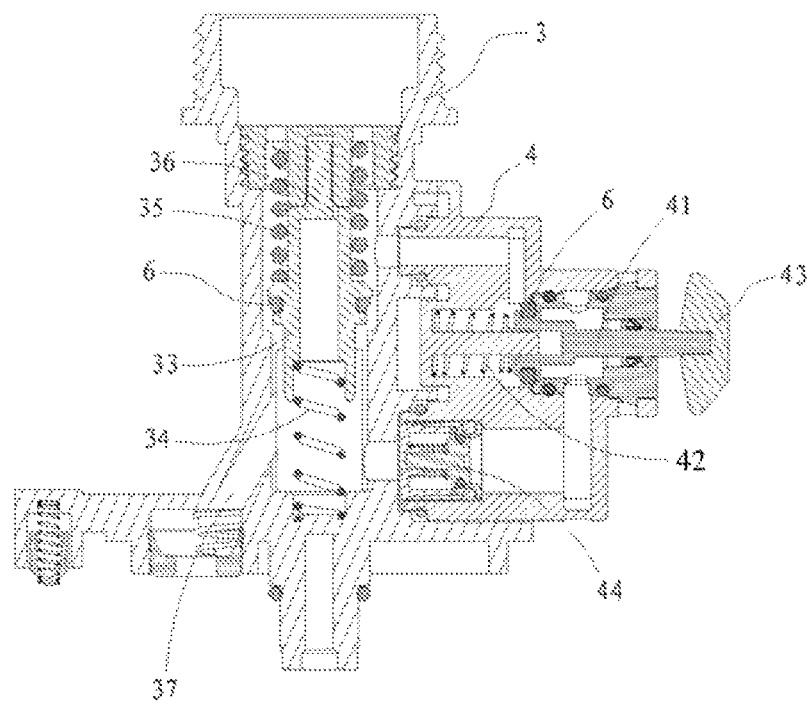
FIG. 2 is a schematic section of outlet components for the first mode of carrying out the invention.

According to FIGS. 1 & 2, it is a temperature control device, including parts as body 1, faceplate 2 communicating with the outlet end of the body 1 and the outlet assembly inside the body 1. The said valve 3 is divided into a mainstream 31 and a diversion vent 32. There is a valve rod 33 inside the mainstream channel 31, which will open/close the mainstream flow 31 through a bias spring 34 on the bottom and a memory spring 35 on the top. The said diversion vent 32 is connected to the said diversion assembly and then makes a diversion channel. The said diversion assembly consist of a fixed seat 4 and a switching rod 41 located inside the fixed seat 4. A switching rod 41 one of whose side being connected to a offsetting spring 42 while the other connected to a button 43 is to open/close the diversion channel.

There is a one-way valve 44 behind the said diversion channel which can effectively prevent cold water from mainstream channel from going into diversion channel in reverse direction through diversion outlet.

The button 43 is being connected to a switch 5 inside one side body 1 of the faceplate 2. Just push the switch 5 which can move forward the button 43 and then move the switching rod 41 and then open the diversion channel. In the end the switch will reset through the offsetting spring.

There is a bore inside the valve rod 33 and its top is being connected to the trickle hole 36 of mainstream 31. When hot water is working, the memory spring 35 will push the valve rod 33 and close the mainstream 31. Since the diversion channel is still not open yet, it will increase the mainstream pressure because of the hot water. Under this circumstance, the hot water will trickle through the hole 36 and decrease the mainstream pressure so as to effectively avoid any breakdown or safety risks because of high mainstream 31 pressure. Of course, the trickle hole 36 can also be located in the switching rod 41 inside the diversion channel.

On the bottom part of the valve 3 there is an outlet 37, which is making an acute angle with the valve 3. The outlet 37 and the valve 3 is integrated into an obliquity which makes it not only easy for water running through but also simplified working process as well as saving time and energy caused by two components instead of one compound.

There are seals 6 over on/off section on both of the valve rod 33 and switching rod 41. The seals 6 are normal ring or washer which can effectively increase seal function.

The FIG. 1 also shows its working status during cold water. The arrow indicates the cold water running through the mainstream. Under this circumstance, the memory spring 35 shrinks while the valve rod 33 is on under condition of the bias spring 34 and then open the mainstream which cold water will run through.

Figure 3:
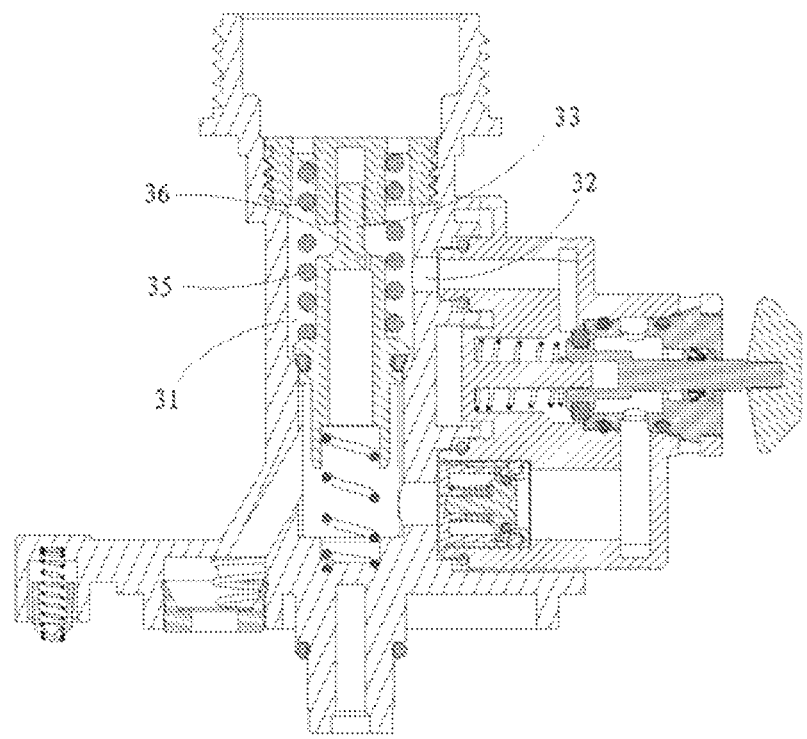
FIG. 3 is a working status chart of outlet components after running out cold water for the first mode of carrying out the invention.

FIG. 3 shows a working status of outflowing hot water after running out cold water. At this time, the memory spring 35 will extend and push downward the valve 33 and close the mainstream 31 then hot water can only flow through the diversion vent 32 to the diversion channel instead of mainstream 31. Since the diversion channel is closed and blocks the hot water which can only flow through the trickle hole 36 in a trickle status so as to avoid any safety issues because of high internal pressure for mainstream 31.

Figure 4:
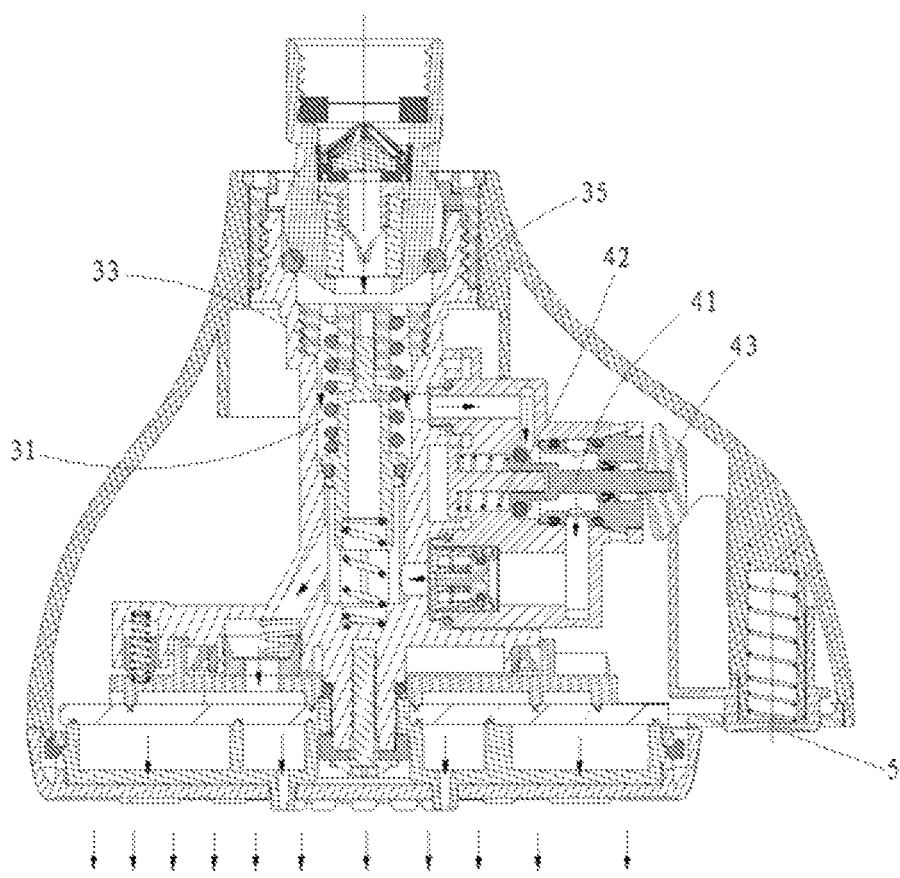
FIG. 4 is a working status chart for hot water flowing for the first mode of carrying out the invention.
Figure 5:
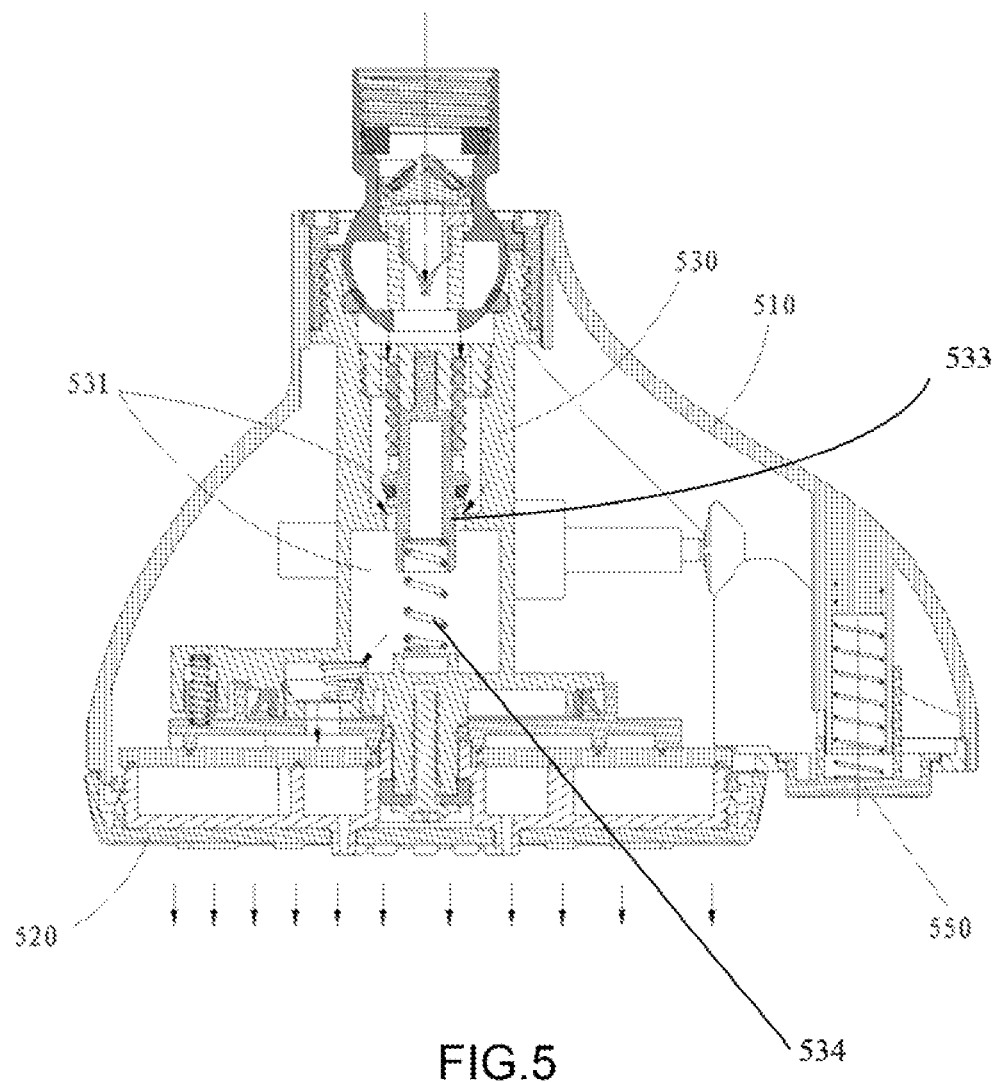
FIG. 5 is a schematic section for the second mode of carrying out the invention.

The FIG. 4 shows a working status for hot water working. Push the switch 5, the button 43 will push the switch rod 41 and open the diversion channel which hot water will run through (shown as the arrow); the switching rod 41 will always keep open because of the running pressure. Then the hot water will outflow.

When water temperature decreases, the memory spring 35 inside the mainstream 31 will go back to its contraction status while the valve rod 33 will move forward and open the mainstream 31. Water pressure of the diversion channel will be decreased and the switching rod 41 will close the diversion channel under condition of the reset spring 42. At this time, water will flow through the mainstream 31 and the temperature control outlet device will go back to its working status shown as in FIG. 1.

The second mode of carrying out the invention.

According to FIGS. 5, 6, 6A & 6C, it is a temperature control device, including parts as body 510, faceplate 520 which is placed at the outlet of body 510 and some internal outlet components placed inside the body 510. A valve 530, one part of the outlet components is divided into a mainstream 531 and a diversion vent 532. There is a valve rod 533 inside the mainstream channel 531, which will open/close the mainstream flow 531 through a bias spring 534 on the bottom and a memory spring 535 on the top, i.e. the main and major channel. The diversion vent 532 is connected to some diversion components and then makes a diversion channel, i.e. a minus channel.

The claimed diversion components are located at one side of the mainstream 531 which include a fixed seat 540, a switch rod 541 which is inside the fixed seat 540. The switch rod 541 connects one side to the reset spring 542 and the other to the button 543 so as to open/close the diversion channel. There is a bulge on the switching rod 541, and at the two sides of the bulge there are seals; the bulge is intended for the switching rod 541 to close the diversion channel. The bulge can be angular or arc only if it can close the diversion channel.

At this mode, since the diversion channel is a vertical structure without any reverse direction issue so no need to set a one-way valve at the end of the diversion channel as described in the first mode.

The said button 543 is being connected to the switch 550 inside the body 510 which is one side of the faceplate 520. Push the switch 550 which can push the button 533 so as to further move the switching rod 541 and then open the diversion channel. The switch 550 will reset through springs.

The valve rod 533 whose top can also be connected to the trickle hole from the mainstream 531 (not shown) which is the same as the first mode, so no need to repeat again.

There is an outlet 537 being set at the bottom of the mainstream 531 of the valve 530. And the outlet 537 is directed to the faceplate 520.

There are seals 560 over on/off section on both of the valve rod 533 and the switching rod 541 and the seals 560 are normal rings or washers which can effectively increase seal function.

Figure 6:
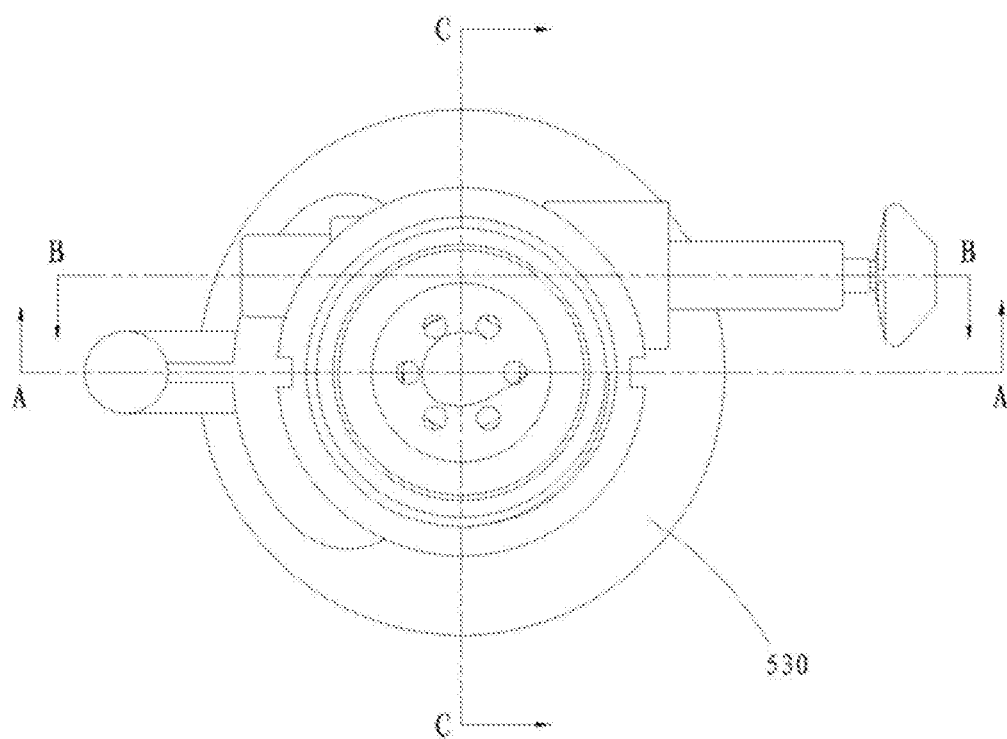
FIG. 6 is a top view of valve itself for the second mode of carrying out the invention.
Figure 6A:
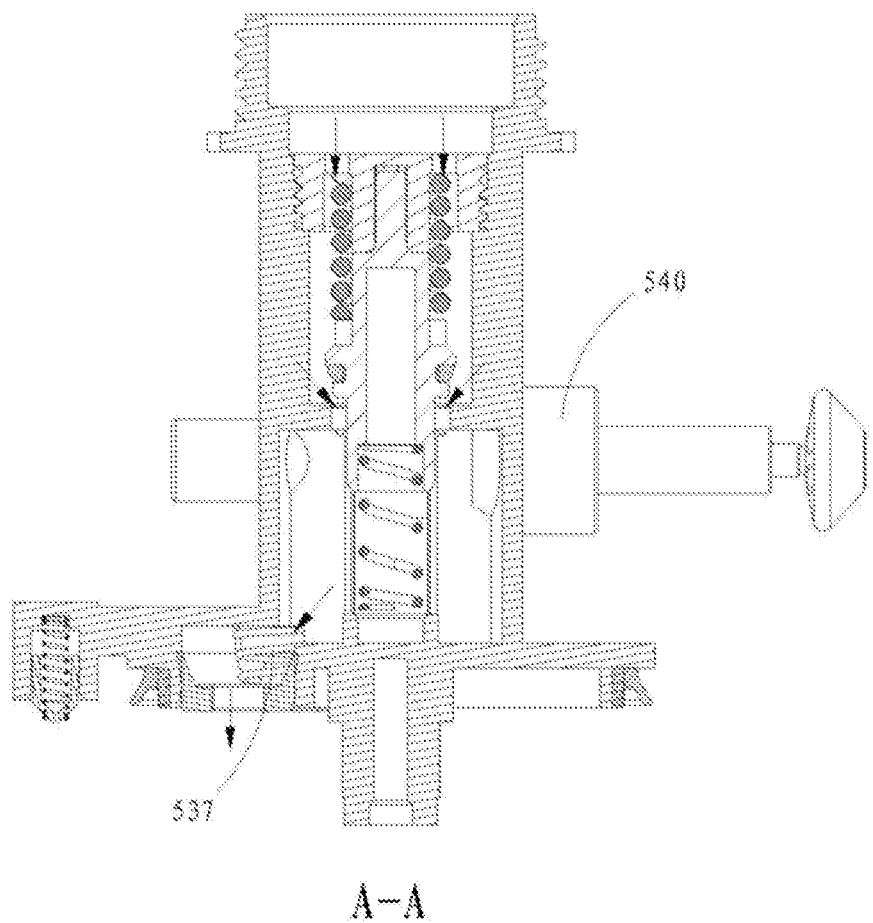
FIG. 6A-6C are section views separately for A-A, B-B, C-C.
Figure 6B:
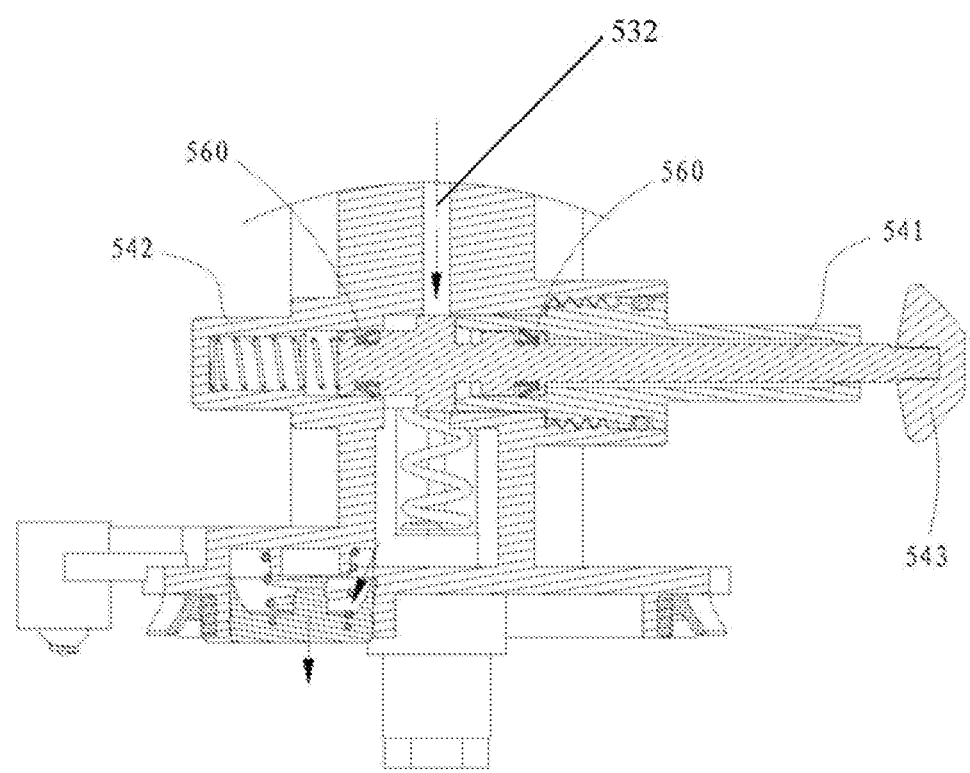
Figure 6C:
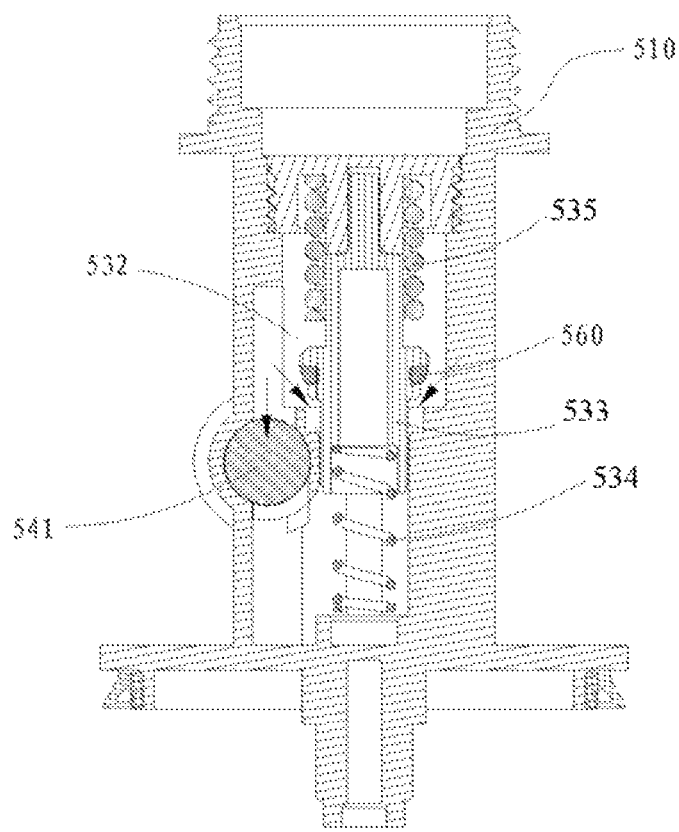
Figure 7:
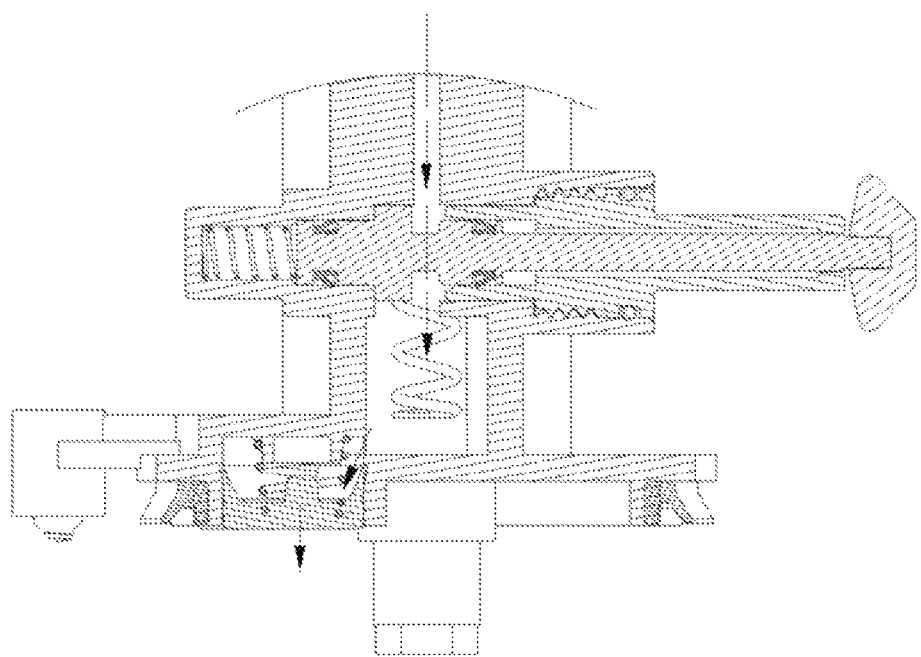
FIG. 7 is a chart of open diversion channel for the second mode of carrying out the invention.

Arrows in FIG. 6A to 6B shows separately chart of diversion closure, mainstream open and water running through mainstream; FIG. 7 shows water running through diversion channel.

Working details of the temperature outlet device at this mode is the same as the first mode, both through close/open the mainstream and the diversion channel so as to switch from cold water to hot, so no more repeating.

The third mode of carrying out the invention.

Figure 8:
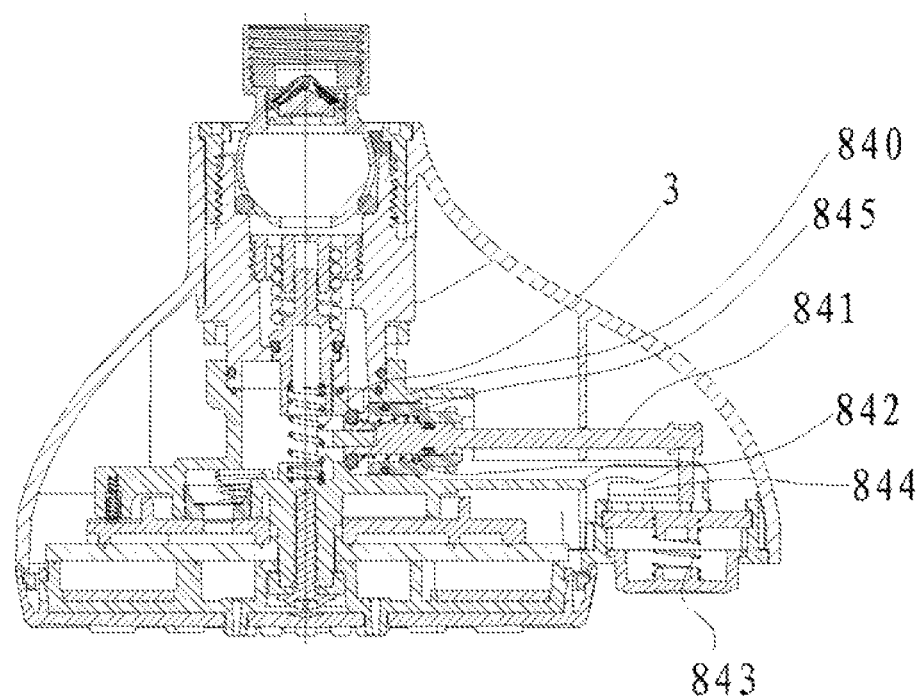
FIG. 8 is a schematic section for the third mode of carrying out the invention.

FIG. 8 is a schematic section for the third mode of carrying out the invention. As shown in FIG. 8, the claimed diversion assembly are set at one side of the mainstream and include a fixed seat 840 and a switching rod 841 inside the fixed seat 841. The diversion channel is at one side of the switching rod 841 and move horizontally through 841 so as to open and close the diversion channel. There is a reset spring 842 to reset the switching rod 841; and there is the button 843 on the other side to move the switching rod 841. The button 843 is to move the switching rod 840 through the L 844.

There is also a trickle hole 845 which is connected to the diversion channel in the switching rod 841. When the switching rod 841 moves one of its side to the valve 3, then the switching rod 841 will block the diversion channel and water will flow through the trickle hole 845 so as to decrease internal pressure of the mainstream which can effectively avoid any failure or safety issues because of too much high pressure inside the mainstream.

Other structures of the temperature outlet device are the same as the first mode except the above mentioned, herein no more repeating.

The invention of the temperature control device as mentioned above, is functioning through the valve rod inside the mainstream which will close/open the mainstream via the bias spring at the bottom and the memory spring at the top. So when cold water runs out, the hot water will go inside the mainstream then the memory spring will extend because of higher temperature and push downward the valve rod to close the mainstream; then hot water can only go into the diversion channel through the diversion vent. If needs hot water, just push the button and move the switching rod which will open the diversion channel and then hot water will outflow. The temperature control device of this invent will stop outflow when running out cold water so as to save hot water and time because people can go ahead with other tasks during this time which in a way makes it pretty practical. During usage only to set up the claimed temperature control device in a bath room where is intended for a shower then can start using.

Although this invent is being publicized with the above good embodiments and details, they are not used to limited this invent. Any technical staff in this field can make potential changes and adjustments if only not breaking away its essence and scope. So the protective range for this invent should based on the claims requests.

What is claimed is:

1. A temperature control outlet device comprising a body, a faceplate communicating with an outlet end of the body, and an outlet assembly inside the body; the outlet assembly comprises a valve connected to the body; the valve is divided into a mainstream and a diversion vent; a valve rod is provided inside the mainstream; water flow in the mainstream is capable of being blocked by the valve rod through a bias spring on a bottom part of the valve rod and a memory spring on a top part of the valve rod; the diversion vent is connected to a diversion assembly to form a diversion channel; the diversion assembly comprises a switching rod; one end of the switching rod is connected to a reset spring while another end of the switching rod is connected to a button; the switching rod is capable of blocking water flow in the diversion channel;
   a bore is provided inside the valve rod;
   when the water flow in the mainstream is blocked by the valve rod under pushing force of the memory spring during supply of hot water and when water flow in the diversion channel is also blocked concurrently by the switching rod, a trickle hole provided on a top portion of the bore connects the bore and the mainstream for the hot water to trickle from the mainstream to the bore.

2. The temperature control outlet device according to claim 1, wherein a one-way valve is provided behind the diversion channel.

3. The temperature control outlet device according to claim 1, wherein the button is connected to a switch inside the body at one side of the faceplate.

4. The temperature control outlet device according to claim 1, wherein the switching rod is in communication with the trickle hole via the diversion channel.

5. The temperature control outlet device according to claim 1, wherein an outlet of the valve is branched off from a bottom part of the valve in an acute angle with respect to the bottom hart of the valve.

6. The temperature control outlet device according to claim 1, wherein an outlet of he valve is provided at a bottom side of the mainstream.

7. The temperature control outlet device according to claim 1, wherein seals are provided at a section of the valve rod that realizes blocking the water flow in the mainstream, and are also provided at a section of the switching rod that realizes blocking the water flow in the diversion channel.

\* \* \* \* \*